United States Patent [19]

Seong

[11] Patent Number: 5,757,635
[45] Date of Patent: May 26, 1998

[54] POWER FACTOR CORRECTION CIRCUIT AND CIRCUIT THEREFOR HAVING SENSE-FET AND BOOST CONVERTER CONTROL CIRCUIT

[75] Inventor: Hwan-Ho Seong, Seoul, Rep. of Korea

[73] Assignee: Samsung Electronics Co., Ltd., Suwon, Rep. of Korea

[21] Appl. No.: 773,882

[22] Filed: Dec. 26, 1996

[30] Foreign Application Priority Data

Dec. 28, 1995 [KR] Rep. of Korea .................. 1995-61866

[51] Int. Cl.$^6$ .............................. H02M 3/24; H02M 5/42; G05F 1/10
[52] U.S. Cl. .................. 363/89; 363/80; 323/222
[58] Field of Search ..................... 363/79, 80, 81, 363/84, 89, 126; 323/222, 285

[56] References Cited

U.S. PATENT DOCUMENTS

| | | | |
|---|---|---|---|
| 4,677,366 | 6/1987 | Wilkinson et al. | 323/222 |
| 4,683,529 | 7/1987 | Bucher, II | 363/89 |
| 5,001,620 | 3/1991 | Smith | 363/89 |
| 5,006,975 | 4/1991 | Neufeld | 363/80 |
| 5,134,355 | 7/1992 | Hastings | 323/222 |
| 5,612,609 | 3/1997 | Choi | 323/210 |
| 5,617,405 | 4/1997 | Kammiller et al. | 363/89 |

*Primary Examiner*—Stuart N. Hecker
*Assistant Examiner*—Bao Q. Vu
*Attorney, Agent, or Firm*—Jones & Volentine, L.L.P.

[57] ABSTRACT

A power factor correction circuit includes a boost converter, a zero-current detector for detecting a period in which an inductor current is zero, a half-wave rectifier for supplying a power voltage proportional to an output voltage of the boost converter, a control voltage generator for generating a control voltage to control the turn-on time timing of a sense-FET, a turn-on controller for making constant a turn-on duration of the sense-FET, an over current detector for generating a signal when a mirror terminal current of the sense-FET is greater than a predetermined current, an OR gate for performing a logic OR operation of the output signals of the turn-on controller and the over current detector, an output current controller for generating a gate drive signal of the sense-FET, and an under voltage lock out for turning off the power voltage when the power voltage is less than a predetermined voltage. This circuit enables an external pin count to be reduced by having a built-in boost converter controller and a built-in sense-FET in a single package.

11 Claims, 4 Drawing Sheets

POWER FACTOR CORRECTION CIRCUIT AND CIRCUIT THEREFOR HAVING SENSE-FET AND BOOST CONVERTER CONTROL CIRCUIT

BACKGROUND OF THE INVENTION

1. Field of the Invention

The present invention relates to a power factor correction circuit, and more particularly, to a 5-pin power factor correction circuit which is designed to reduce an external pin count by incorporating a built-in boost converter controller and a built-in sense-field effect transistor(sense-FET) in a single package.

2. Description of the Prior Art

Generally, most electric and electronic circuits, such as the switching mode power supply (SMPS), the electronic stabilizer and the uninterruptable power supply (UPS), use a rectifier to convert an alternative current (AC) source to a direct current (DC) source, and then convert the DC source to some other type of source which is needed.

In this case, a smoothing capacitor of the rectifier should be sufficiently large to prevent a ripple voltage which is present at the smoothing capacitor from exceeding an acceptable level. However, at this time there are accompanying disadvantages in that a transmitting line loss increases and an effective power to be used in a same capacitor of a power station decreases as the power factor of a pulse type AC increases from 60% to 70%.

As such, there are generally two methods used to increase the input power factor of the rectifier and to decrease the ripple voltage output from the rectifier.

One is to insert a choke inductor between the rectifier and the smoothing capacitor.

The other is to control input current by use of a boost converter. There are three techniques associated with this method, i.e., continuous current control, discontinuous current control and control at the boundary of the continuous and the discontinuous current.

Here, the third technique is generally recognized to be comparatively favorable with respect to the power factor obtained, and with respect to the efficiency and cost thereof, while at the same time using a comparatively small capacitor.

Controllers used to realize this third technique are currently manufactured by numerous companies, and FIG. 1 and FIG. 2 show typical application circuits thereof.

However, circuits such as those shown in FIG. 1 and 2 suffer disadvantages in that the system as a whole becomes larger, and the external pin numbers and manufacturing costs are relatively high. The controller and a metal oxided semiconductor (MOS) transistor used to sense an output current are built into each package and many auxiliary components are needed.

SUMMARY OF THE INVENTION

In view of the above, it is an object of the present invention to provide a power factor correction circuit which is designed to reduce an external pin count by incorporating a built-in boost converter controller and a built-in sense-FET in a single package.

To achieve the above-mentioned object, according to a preferred embodiment of the present invention, a power factor correction circuit includes a first means for controlling input current at a boundary of a continuous and a discontinuous current upon receiving a DC source from a rectifier, the first means including capacitors, an inductor, a sense-FET and a diode; second means for detecting a period in which the inductor current is zero; third means for supplying a power voltage which is proportional to an output voltage of the first means by rectifying the inductor winding voltage which is proportional to an output voltage of the first means when the sense-FET is turned off; fourth means for controlling a turn-on time of the sense-FET by comparing an input voltage with a reference voltage upon receiving the input voltage output from the third means; fifth means for making the turn-on time of the sense-FET constant by comparing a generated saw tooth waveform with an output signal of the fourth means, upon generating the saw tooth waveform having a constant rise time during a period from a start control signal to a stop control signal; sixth means for generating a signal when a mirror terminal current of the sense-FET becomes more than a predetermined current; and seventh means for generating a gate drive signal of the sense-FET upon receiving the output signal of the second means as a set input and receiving an output signal of the fifth means or the sixth means as a reset input.

DETAILED DESCRIPTION OF THE PREFERRED EMBODIMENTS

A preferred embodiment of the present invention is described below with reference to the accompanying drawings.

Figure 1:
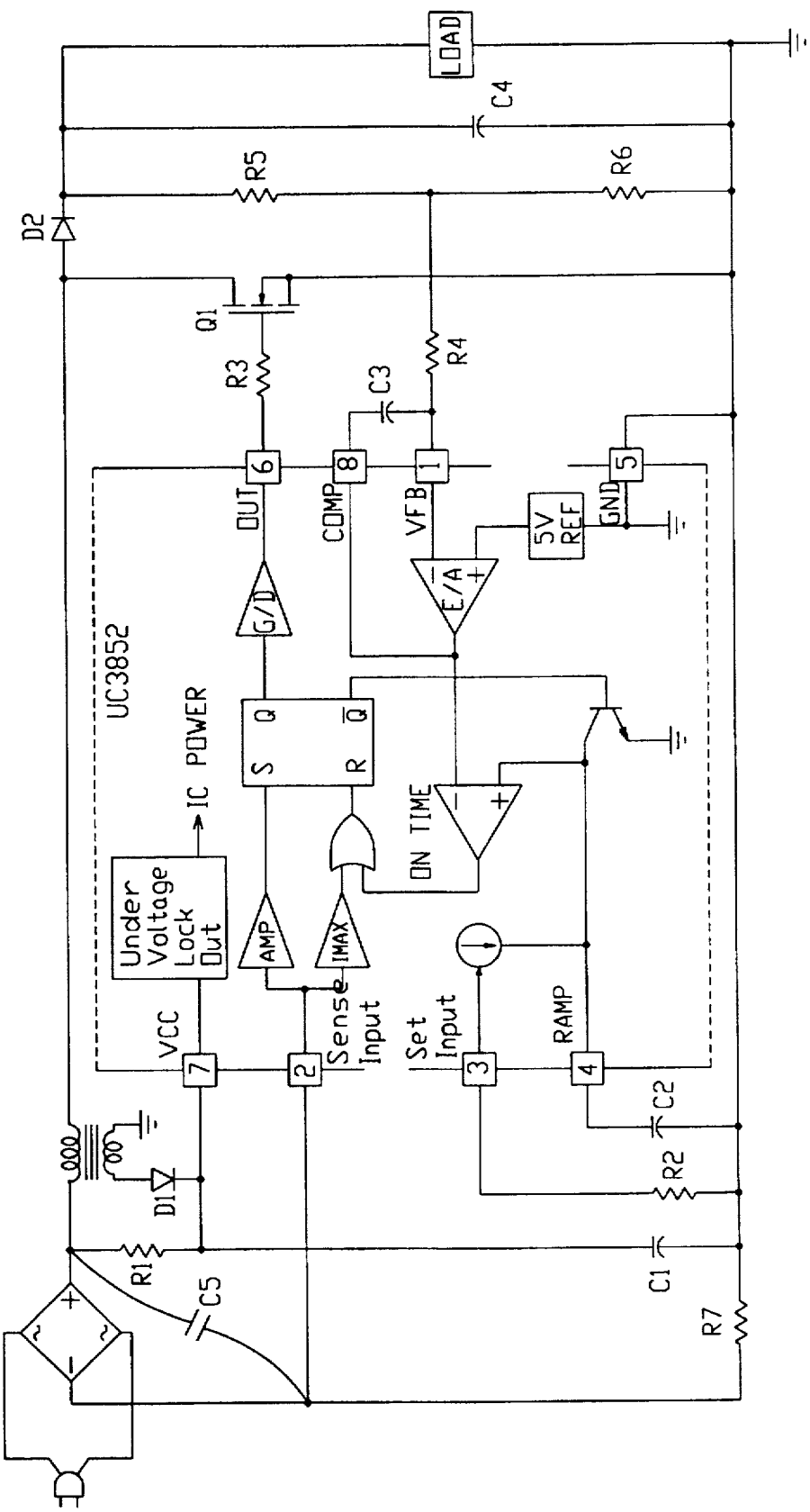
FIG. 1 is an application circuit diagram illustrating one embodiment of a conventional power factor correction circuit.
Figure 2:
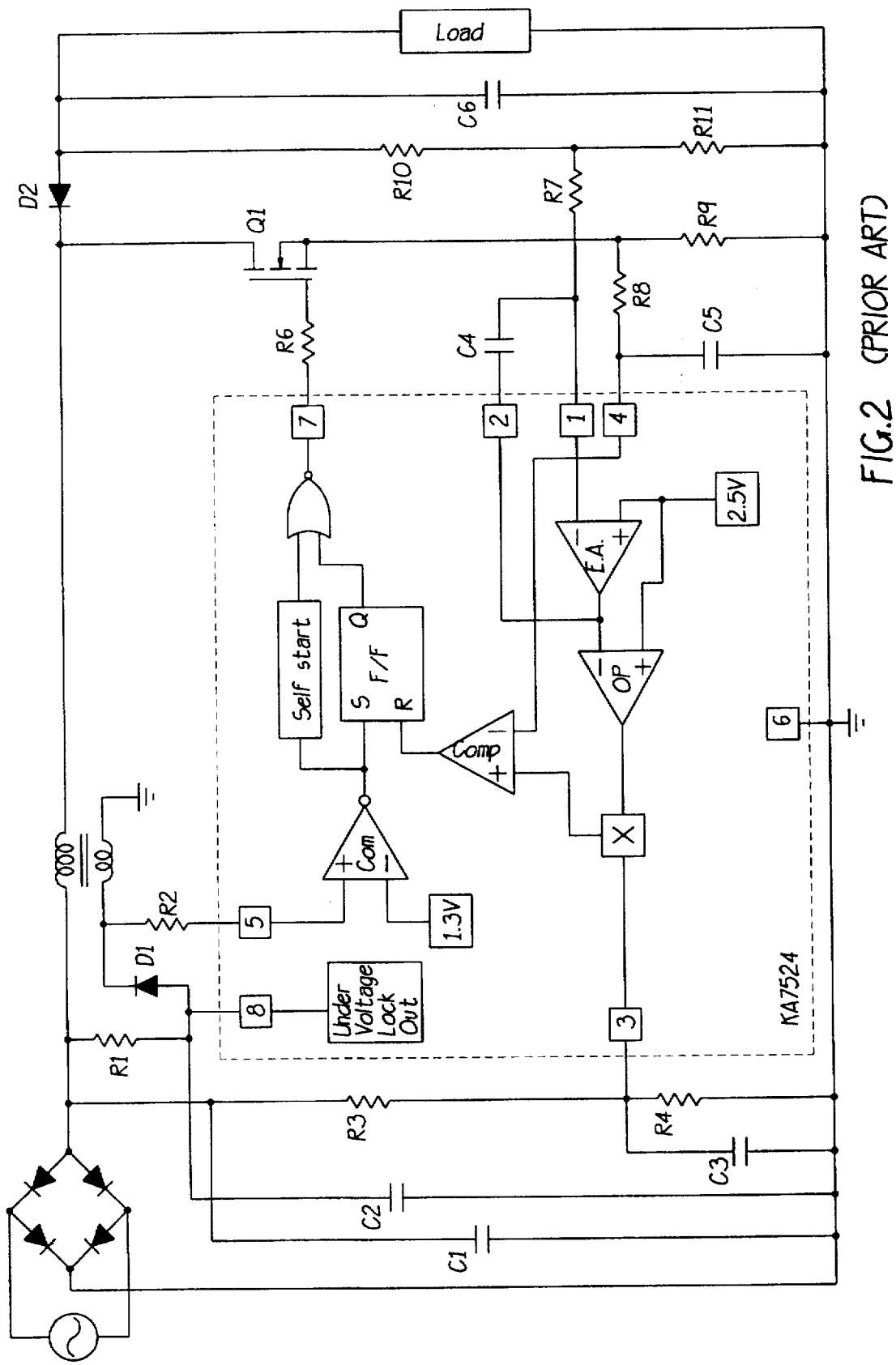
FIG. 2 is an application circuit diagram illustrating another embodiment of a conventional power factor correction circuit.
Figure 3:
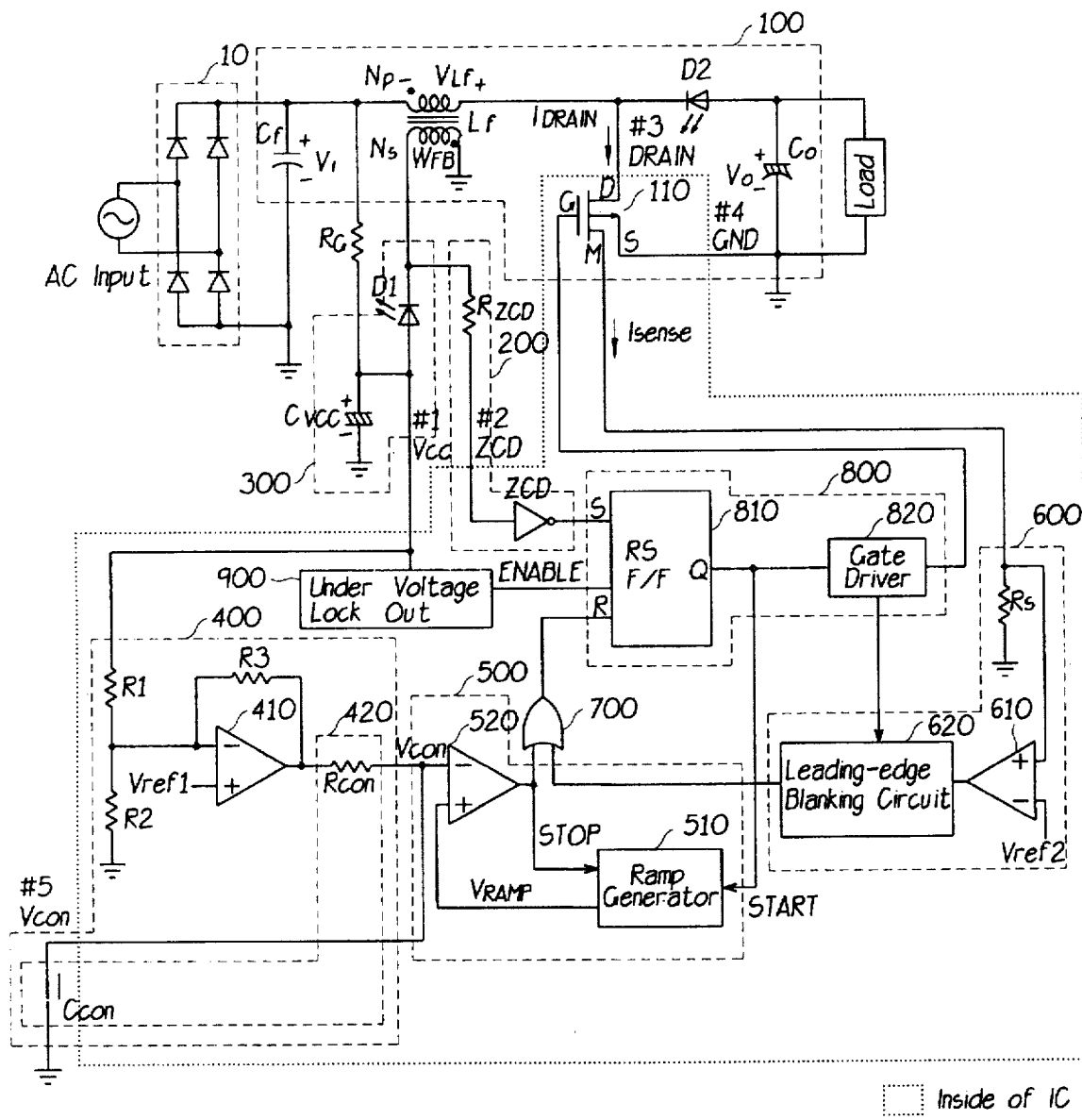
FIG. 3 is a detailed circuit diagram of a 5-pin power factor correction circuit in accordance with a preferred embodiment of the present invention.

As shown in FIG. 3, the power factor correction circuit includes a boost converter 100 for controlling an input current at the boundary of a continuous and a discontinuous current after receiving a DC source from a bridge rectifier 10, the boost converter 100 including capacitors Cf, Co, an inductor Lf, a sense-FET 110 and a diode D2; a zero-current detector 200 for detecting a period in which the inductor Lf current is zero; a half-wave rectifier 300 for supplying a power voltage Vcc which is proportional to an output voltage Vo of the boost converter 100 by rectifying the inductor winding $W_{FB}$ voltage which in turn is proportional to an output voltage Vo when the sense-FET 110 is turned off, the half-wave rectifier 300 including a diode D1 and a smoothing capacitor Cvcc; a control voltage generator 400 for generating a control voltage Vcon to control a turn-on time of the sense-FET 110 by comparing an input voltage Vcc with a first reference voltage Vref1 after receiving the input voltage Vcc; a turn-on controller 500 for making constant the turn-on time of the sense-FET 110 by comparing a generated saw tooth wave VRAmp with the control voltage Vcon, the saw tooth wave VRAmp having a constant rise time between a start control signal START and a stop control signal STOP; an overcurrent detector 600 for generating a signal when a mirror terminal current Isense of the sense-FET 110 exceeds a predetermined current; an OR gate 700 for performing a logic OR operation upon received output signals of the turn-on controller 500 and the overcurrent detector 600; an output current controller 800 for generating a gate drive signal of the sense-FET 110 upon receiving the output signal of the zero-current detector 200 as a set S input and receiving the output signal of the OR gate 700 as a reset R input; and an under voltage lock out 900 for turning off the power voltage Vcc when the power voltage Vcc is less than a predetermined voltage.

As shown in FIG. 3, the zero-current detector 200 includes a resistor $R_{ZCD}$ for resistively detecting a period in which the inductor Lf current is zero, and an inverter ZCD for generating a signal when a current through the resistor $R_{ZCD}$ is zero.

As also shown in FIG. 3, the control voltage generator 400 includes resistors R1, R2 for resistively dividing the power input voltage Vcc; an error amplifier 410 for generating the control voltage Vcon upon receiving a voltage present at a connection point of the resistors R1, R2 as an inverting(−) input and receiving the first reference voltage Vref1 as a non-inverting(+) input; and a low pass filter 420 for filtering the output signal of the error amplifier 410 and including a resistor Rcon and a capacitor Ccon.

The illustrated turn-on controller 500 includes a ramp generator 510 for generating a saw tooth wave $V_{RAMP}$ having a constant rise time between a start control signal START and a stop control signal STOP; and a comparator 520 for generating a signal which causes the turn-on time of the sense-FET 110 to be constant by comparing a received saw tooth wave $V_{RAMP}$ as a non-inverting(+) input and a received control voltage Vcon as an inverting(−) input, and outputting on a stop control signal STOP to the ramp generator 510.

The overcurrent detector 600 of FIG. 3 includes a resistor Rs for detecting the mirror terminal current Isense of the sense-FET 110; a comparator 610 for outputting a signal when the current Isense is greater than a predetermined current by comparing a received voltage of the resistor Rs as a non inverting(+) input and a received second reference voltage Vref2 as an inverting(−) input; and a leading-edge blanking circuit 620 for deleting a pulse type of noise signal generated in the leading edge part of a drain current wave of the sense-FET 110 when the sense-FET 110 is turned on.

The output current controller 800 shown in FIG. 3 includes an RS flip-flop 810 for supplying the start control signal START to the ramp generator 510 after receiving the output signal of the zero-current detector 200 as a set S input and receiving the output signal of the OR gate 700 as a reset R input; and a gate driver 820 for driving the gate terminal of the sense-FET 110 after receiving the start control signal START outputted from the RS flip-flop 810.

The operation of the thus configured power factor correction circuit is described below.

First, the sense-FET 110 enables a small power resistor to sense a large drain current, and functions to generate a small mirror current Isense proportional to a drain current $T_{DRAIN}$ at the mirror terminal M. The sense-FET 110 is driven by the gate driver 820. The sense-FET 110 is turned on if the output signal of the gate driver 820 is a 'high' logic level, and is turned off if the output signal of the gate driver 820 is a 'low' logic level.

The gate driver 820 receives the output terminal Q signal of the RS flip-flop 810. The terminal Q signal of the RS flip-flop 810 will be 'high' if the output signal of the zero-current detector 200 is 'high', and will be 'low' if the output signal of the OR gate 700 is 'high'. The under voltage lock out 900 enables the RS flip-flop 810 when the power voltage Vcc is greater than a predetermined voltage.

The current Isense is input to the non inverting(+) terminal of the comparator 610 after being converted to a voltage through the resistor Rs, and the comparator 610 outputs a 'high' signal if the voltage inputted to the non-inverting(+) terminal is greater than the second reference voltage Vref2 input to the inverting(−) terminal. The output signal of the comparator 610 is applied to one input terminal of the OR gate 700 through the leading-edge blanking circuit 620.

By way of the above-described operation, the sense-FET 110 is turned off when the drain current of the sense-FET 110 is greater than the predetermined current.

Figure 5:
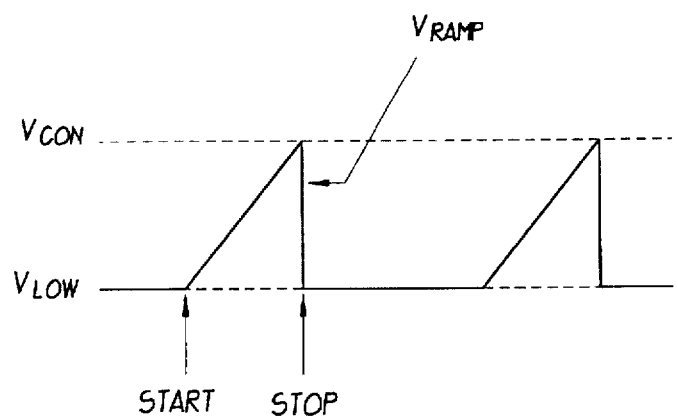
FIG. 5 is an output waveform diagram of a ramp generator in the 5-pin power factor correction circuit shown in FIG. 3.

As shown in FIG. 5, the ramp generator 510 outputs a ramp voltage $V_{RAMP}$ that increases linearly in value from a 'low' voltage $V_{LOW}$ upon application of a 'high' signal to the start terminal thereof, and then, if the ramp voltage $V_{RAMP}$ becomes greater than the control voltage Vcon, the ramp voltage $V_{RAMP}$ is kept to a 'low' voltage $V_{LOW}$ until a next 'high' signal is applied to the start terminal. That is, the ramp voltage $V_{RAMP}$ becomes a 'low' voltage $V_{LOW}$ when the output signal of the comparator 520 becomes 'high'.

Considering that the ripple of the control voltage Vcon is almost zero, by way of the above-described operation, the turn-on time of the sense-FET 110 can always be kept constant. That is, the time for the ramp voltage $V_{RAMP}$ to reach to the control voltage Vcon is constant as the output signal of the RS flip-flop 810 becomes 'high' and the ramp voltage $V_{RAMP}$ linearly increases in value.

The operating principle of the 5-pin power factor correction circuit according to a preferred embodiment resides in the characteristic that the output voltage Vo can be kept constant if the power voltage Vcc is kept constant. This is, because the inductor Lf windings WFB voltage and the power voltage Vcc are proportional to the output voltage Vo.

The external pin count of the integrated circuit is reduced to a minimum by relying on this principle to use only one pin for sensing the output voltage Vo and supplying the power voltage Vcc.

The circuit operation can be expressed as follows when the sense-FET 110 is turned on:

$$V_{LF} = -Vi \quad (1)$$

where $V_{LF}$ is the inductor Lf voltage, and Vi is an input voltage.

On the other hand, the inductor Lf current is freewheeling through the diode D2 if the sense-FET 110 is turned off. Thus, this situation can be expressed as follows:

$$V_{LF} = Vo - Vi \quad (2)$$

where Vo is the output voltage.

Here, the inductor voltage $V_{LF}$ becomes the same as the output voltage Vo when the input voltage Vi is zero. Therefore, the power voltage Vcc will be proportional to the output voltage Vo if the inductor voltage $V_{LF}$ is rectified by the diode D1 and the smoothing capacitor Cvcc.

The error amplifier 410 in the control voltage generator 400 decreases the turn-on time of the sense-FET 110 by decreasing the control voltage Vcon if the voltage present at the connection point of the resistors R1, R2 is greater than the first reference voltage Vref1. On the contrary, the error amplifier 410 increases the turn-on time of the sense-FET 110 by increasing the control voltage Vcon if the voltage present at the connection point of the resistors R1, R2 is less than the first reference voltage Vref1. The low pass filter 420 makes the control voltage Vcon almost a direct current type of voltage. This can reduce the distortion of alternative current input.

Figure 4:
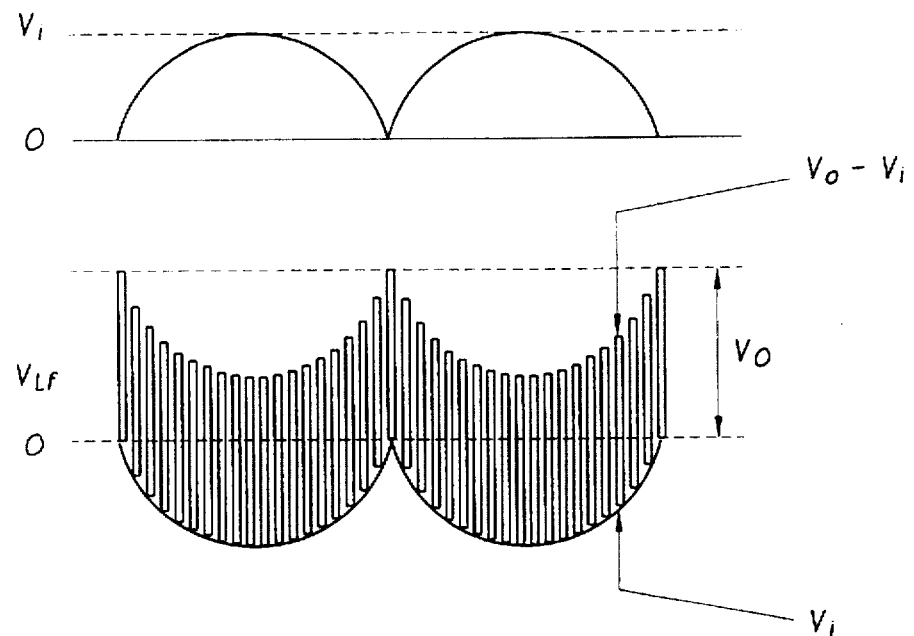
FIG. 4 is a waveform diagram of the inductor voltage in the 5-pin power factor correction circuit shown in FIG. 3.

The resistor $R_{ZCD}$ is used to detect the period in which the inductor Lf current is zero as the inductor Lf current flows through the diode D2. The inductor Lf voltage $V_{LF}$ will go from (Vo-Vi) to zero as shown in the expression (2) if the inductor Lf current becomes zero at this time, the output signal of the inverter ZCD changes from 'low' to 'high', and the output signal of the RS flip-flop 810 turns on the sense-FET 110 by becoming 'high'. FIG. 4 is a waveform diagram of the inductor voltage $V_{LF}$ in the 5-pin power factor correction circuit according to a preferred embodiment. In this manner, a configuration having only 5-external pins #1–#5 is sufficient to make constant the output voltage Vo by making the input power factor of the boost converter 100 almost 100%.

Consequently, the advantage effects of the power factor correction circuit are characterized by a reduction in the external pin count and by having a built-in boost converter 100 controller and a built-in sense-FET 110 in a single package.

What is claimed is:

1. A power factor correction circuit comprising:
   output voltage supply means for supplying a constant output voltage to a load by controlling a current from a rectifier at a boundary of a continuous and a discontinuous current, said output voltage supply means including an inductor having a first coil and a second coil, and a sense-FET for sensing a current from said first coil of said inductor, wherein a current of said second coil is induced by the current of said first coil and wherein the current of said first coil is supplied from the rectifier;
   detecting means for detecting a point at which the current of said second coil is zero;
   power voltage supply means for supplying a power voltage proportional to the output voltage of said output voltage supply means by rectifying a voltage of said second coil which is proportional to the output voltage of said output voltage supply means when said sense-FET is turned off;
   control voltage generating means for generating a control voltage to turn-on the sense-FET by comparing the power voltage from said power voltage supply means with a reference voltage;
   turn-on time control means for causing a duration of a turn-on time of said sense-FET to be constant by generating a saw tooth waveform and comparing the saw tooth waveform with the control voltage of said control voltage generating means;
   signal generating means for generating a signal when a mirror terminal current of said sense-FET is greater than a predetermined current; and
   means, having a set input and reset input, for generating a gate drive signal applied to said sense-FET in accordance with an output signal of said detecting means received as the set input, and an output signal of said turn-on time control means or said signal generating means received as the reset input.

2. A power factor correction circuit of claim 1, wherein said detecting means comprises:
   a resistor connected to said second coil of said inductor; and
   means for generating a signal when said current level through said resistor is zero.

3. A power factor correction circuit of claim 1, wherein said control voltage generating means comprises:
   first and second resistors connected in series to an output terminal of said power voltage supplying means;
   an error amplifier, having an inverting input and a non-inverting input, for generating the control voltage by amplifying a difference between a voltage applied to said second resistor as the inverting input and a reference voltage as the non-inverting input; and
   a low pass filter for filtering the control voltage of said error amplifier.

4. A power factor correction circuit of claim 1, wherein said turn-on time control means comprises:
   a ramp generator for generating the saw tooth waveform in response to a start control signal and a stop control signal; and
   a comparator, having an inverting input and a noninverting input, for comparing the saw tooth waveform as the non-inverting input and the control voltage received as the inverting input, wherein a signal from said comparator is applied as the stop control signal of said ramp generator.

5. A power factor correction circuit of claim 4, wherein the gate drive signal generating means comprises:
   a reset-set flip-flop for supplying the start control signal to said ramp generator when a set input signal is 'high' upon receiving an output signal of said detecting means as a set input and the output signal of said control means or said signal generating means as a reset input; and
   a gate driver for driving the gate terminal of said sense-FET in response to the start control signal.

6. A power factor correction circuit of claim 5, further comprising an under voltage lock out for enabling said reset-set flip-flop when the power voltage is treater than a predetermined voltage.

7. A power factor correction circuit of claim 1, wherein said signal generating means comprises:
   a resistor connected with the mirror terminal of said sense-FET;
   a comparator for generating a signal when the voltage applied to said resistor is greater than a reference voltage by comparing the voltage applied to the resistor as a non-inverting input and the reference voltage as an inverting input; and
   a leading-edge blanking circuit for deleting a pulse type of noise signal generated in a leading edge part of a drain current waveform of said sense-FET when said sense-FET is turned on.

8. A power factor correction circuit of claim 1, wherein said power voltage supply means is a half-wave rectifier.

9. A power factor correction circuit of claim 1, wherein said sense-FET of said output voltage supply means is contained within a 5-pin IC package, and wherein said inductor of said output voltage supply means is external said 5-pin IC package.

10. An integrated circuit for use with a boost converter of a power factor correction circuit, comprising:
   a single IC package having first through fifth external pin terminals;
   a sense-FET, contained within said single IC package and having a drain coupled to the first external pin terminal and a source coupled to the second external pin terminal, for draining a current of the boost converter when activated; and a boost converter controller circuit, contained within said single IC package and operatively connected to a gate terminal of said sense-FET, for activating and deactivating said sense-FET in accordance with voltages applied to the third, fourth and fifth external pin terminals.

11. An integrated circuit of claim 10, wherein said single IC package has no more than the first through fifth external pin terminals.

* * * * *